Patented July 3, 1923.

1,460,422

UNITED STATES PATENT OFFICE.

SIEGFRIED KOHN, OF PHILADELPHIA, PENNSYLVANIA, ASSIGNOR TO ROHM & HAAS COMPANY, A CORPORATION OF DELAWARE.

SYNTHETIC TAN AND PROCESS OF MAKING SAME.

No Drawing. Application filed January 30, 1922. Serial No. 532,912.

*To all whom it may concern:*

Be it known that I, SIEGFRIED KOHN, a citizen of the United States, and a resident of Philadelphia, Pennsylvania, have invented a certain new and useful Synthetic Tan and Process of Making Same, of which the following is a specification.

My invention relates to a new composition of matter to be used as a synthetic tan, consisting substantially of a single reaction product of a carbohydrate and phenol-sulphonic acid.

Phenol-sulphonic acid is produced in three isomeric forms (in addition to possible poly-sulphonic acids), and while these three cannot readily be isolated, I have found that one form appears to combine much more readily with a carbohydrate such as hexose than do the others. From experience with other oxy-aromatic acids similar to phenol-sulphonic acid, such as oxy-benzoic acid, I believe that it is para-phenol-sulphonic acid that combines readily with hexose, and from the relative amount of materials in the combination, I believe that the composition which I aim to produce consists essentially of penta-para-phenol sulphonyl hexose. Inasmuch as when phenol is sulphonated, three forms are produced simultaneously, and as only one form combines readily with hexose, it has heretofore been impossible to produce more than small yields of the desired reaction product, with which were mixed large amounts of other undesirable compounds.

While phenol gives a product which is suited to my purposes other aromatic compounds—preferably containing one or more hydroxy-groups, such as cresol, salicylic acid, etc.—may be submitted for phenol in my process and will give a corresponding product. The term phenol as used in this specification and claims is intended to include such equivalents.

On the basis of the foregoing assumptions, it may be said that what I aim to produce is penta-para-phenol-sulphonyl hexose substantially free from other compounds of phenol, and I have succeeded in so producing it by dissolving carbohydrates such as starch, cellulose, dextrin, etc., in sulphuric acid, under conditions which will prevent the carbohydrate from being decomposed to a molecule below the sugar molecule (hexose), and then after the solution is formed, by sulphonating the phenol in the presence of an excess of such dissolved carbohydrate. By carrying on the steps of the process in this order, very different results are obtained than those found when the phenol is added to the sulphuric acid either simultaneously with or prior to the carbohydrate.

When phenol is sulphonated, the meta-, para- and ortho-phenol-sulphonic acid all tend to form to a point of equilibrium and ordinarily the result will be a practically inseparable mixture of these three compounds. If, however, a large excess of carbohydrate is present in the solution, it reacts immediately with the para-phenol-sulphonic acid and apparently upsets the equilibrium so that the reaction tends towards the reestablishment of the relative proportions of the three forms, with the result that substantially all of the phenol is converted into the para-sulphonic acid, and there is obtained a quantitative yield of the desired product substantially free from other compounds of phenol.

The following specific example is given for purposes of illustration only: 100 parts by weight of dextrose were dissolved in 350 parts of sulphuric acid at about 25° C. After most of the dextrose had dissolved, 150 parts by weight of phenol were added keeping the temperature at about 40° C. and the mixture was kept agitated. After sulphonation had been completed, the resulting product was titrated, and the excess of acid was neutralized with caustic soda. The product was found to consist of a material substantially free from undesired phenol compounds and well adapted for use in tanning.

Those skilled in the art can readily adapt this process to other equivalent materials, and can readily change the details of the conditions under which it is carried on.

This case is largely a continuation of my earlier application Serial Number 436,596, filed January 11th, 1921.

What I claim is:

1. Penta-para-phenol-sulphonyl hexose substantially free from other compounds of phenol.

2. A composition of matter consisting primarily of the reaction product of hexose and that form of phenol-sulphonic acid which combines most readily with hexose, and substantially free from other forms of phenol-sulphonic acid, or the derivatives thereof.

3. The process of producing synthetic tan, which comprises the step of sulphonating phenol in the presence of an excess of a previously dissolved carbohydrate.

4. The process of producing a synthetic tan which comprises the steps of treating a carbohydrate with sulphuric acid under conditions adapted to produce a solution of hexose in sulphuric acid, and thereafter adding to such solution a quantity of phenol substantially less than that necessary to combine with sulphuric acid and with the hexose present to form a phenol sulphonyl hexose, and maintaining sulphonating conditions until a substantial quantity of penta-para-phenol sulphonyl hexose is formed.

SIEGFRIED KOHN.